Patented Sept. 18, 1923.

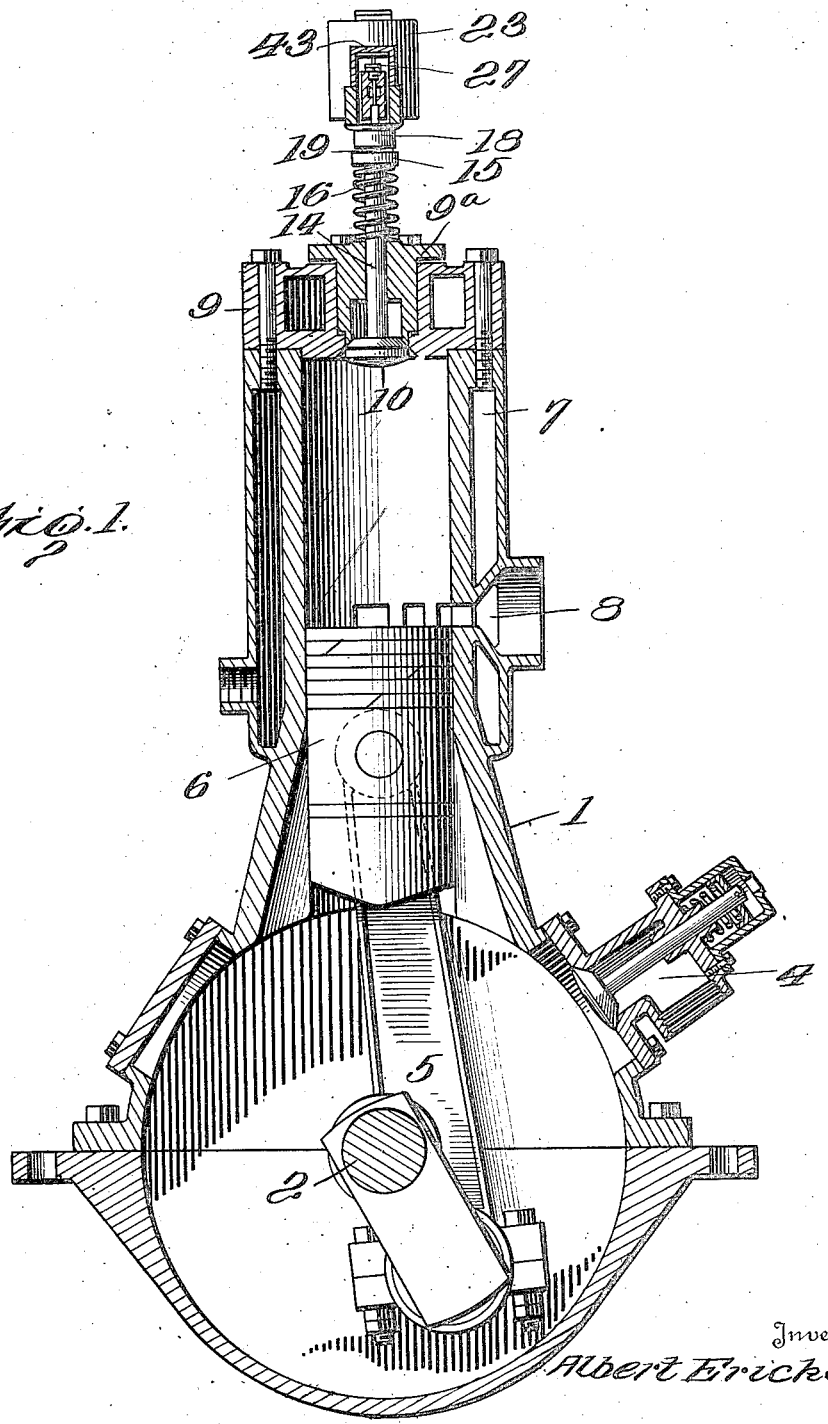

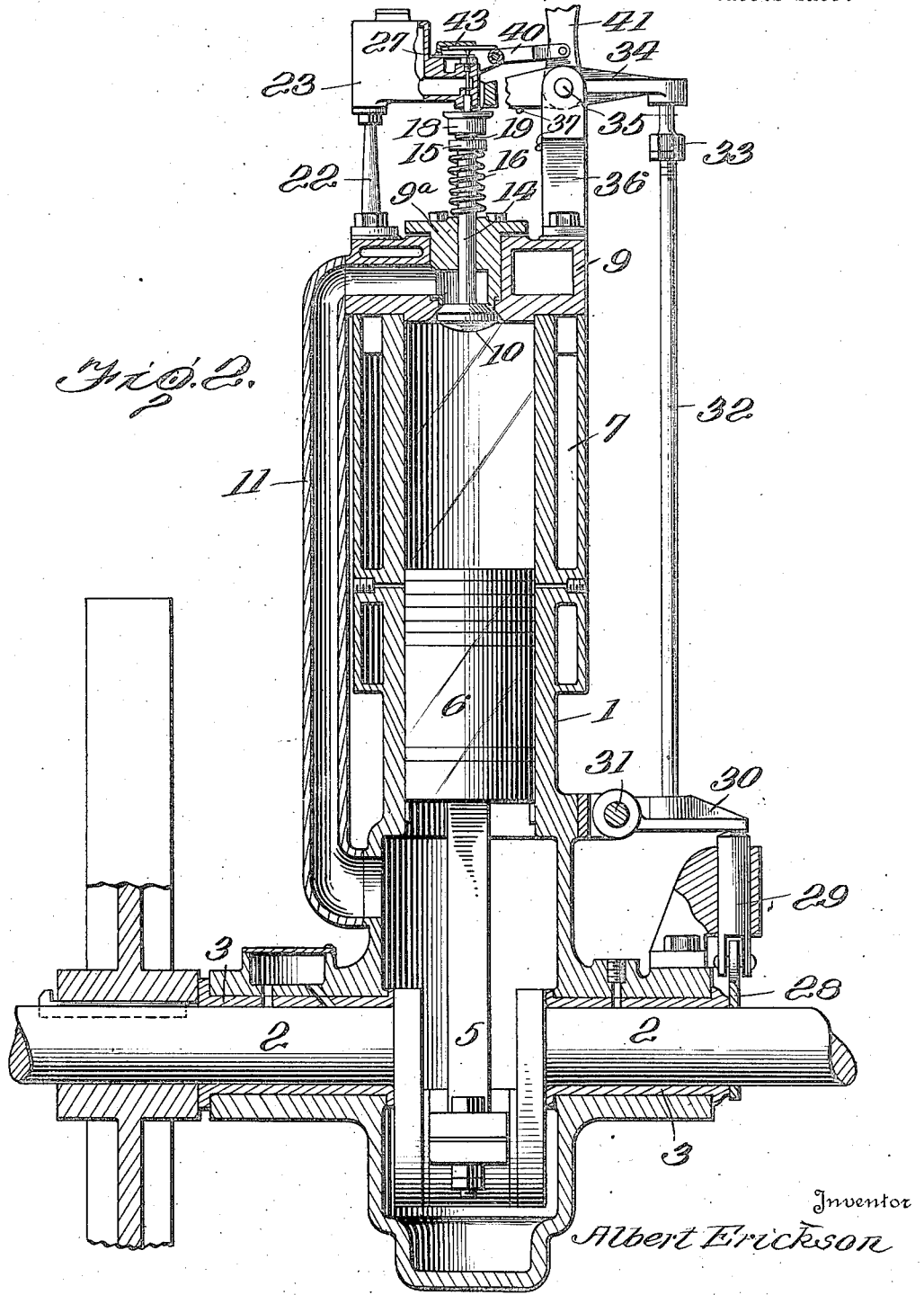

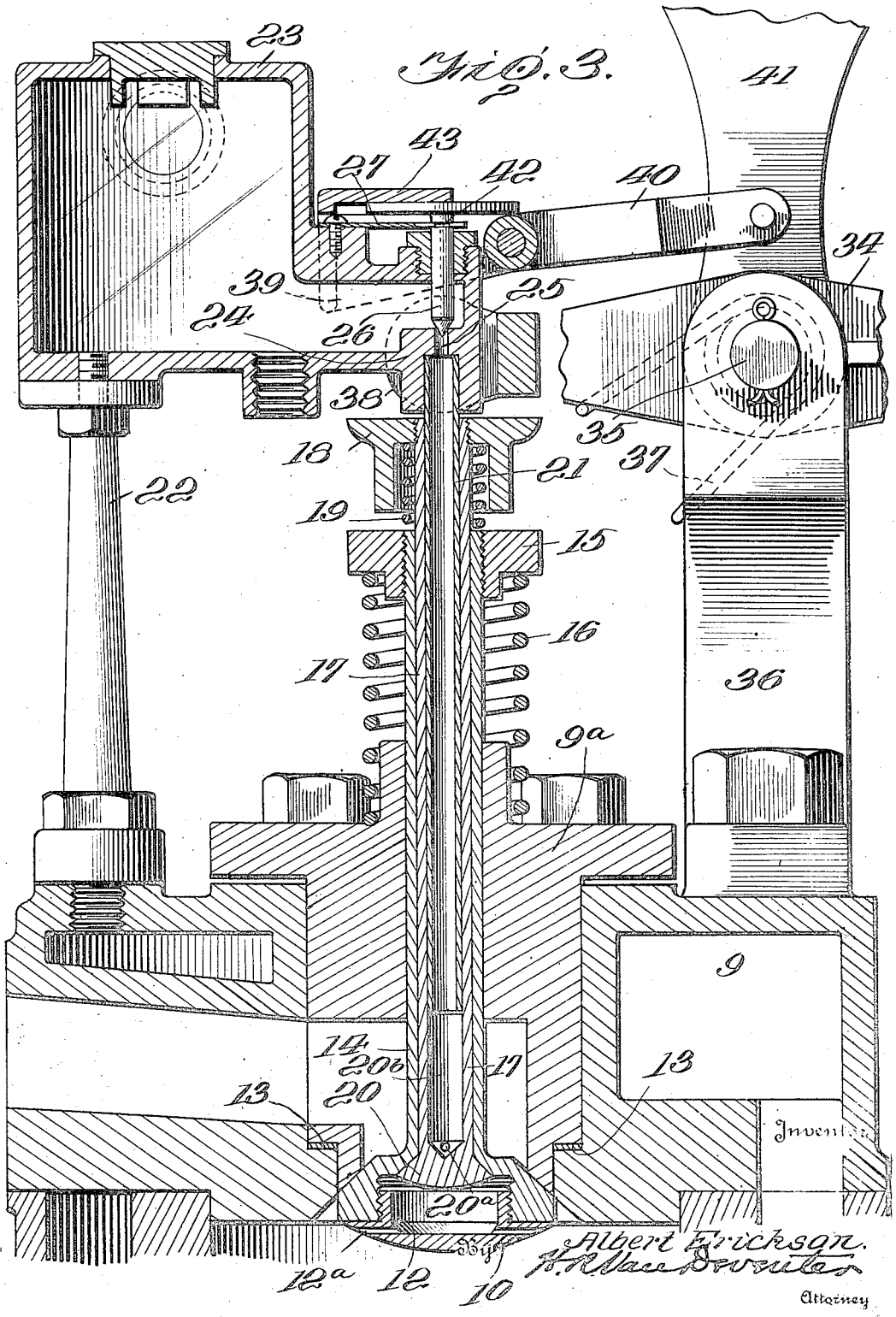

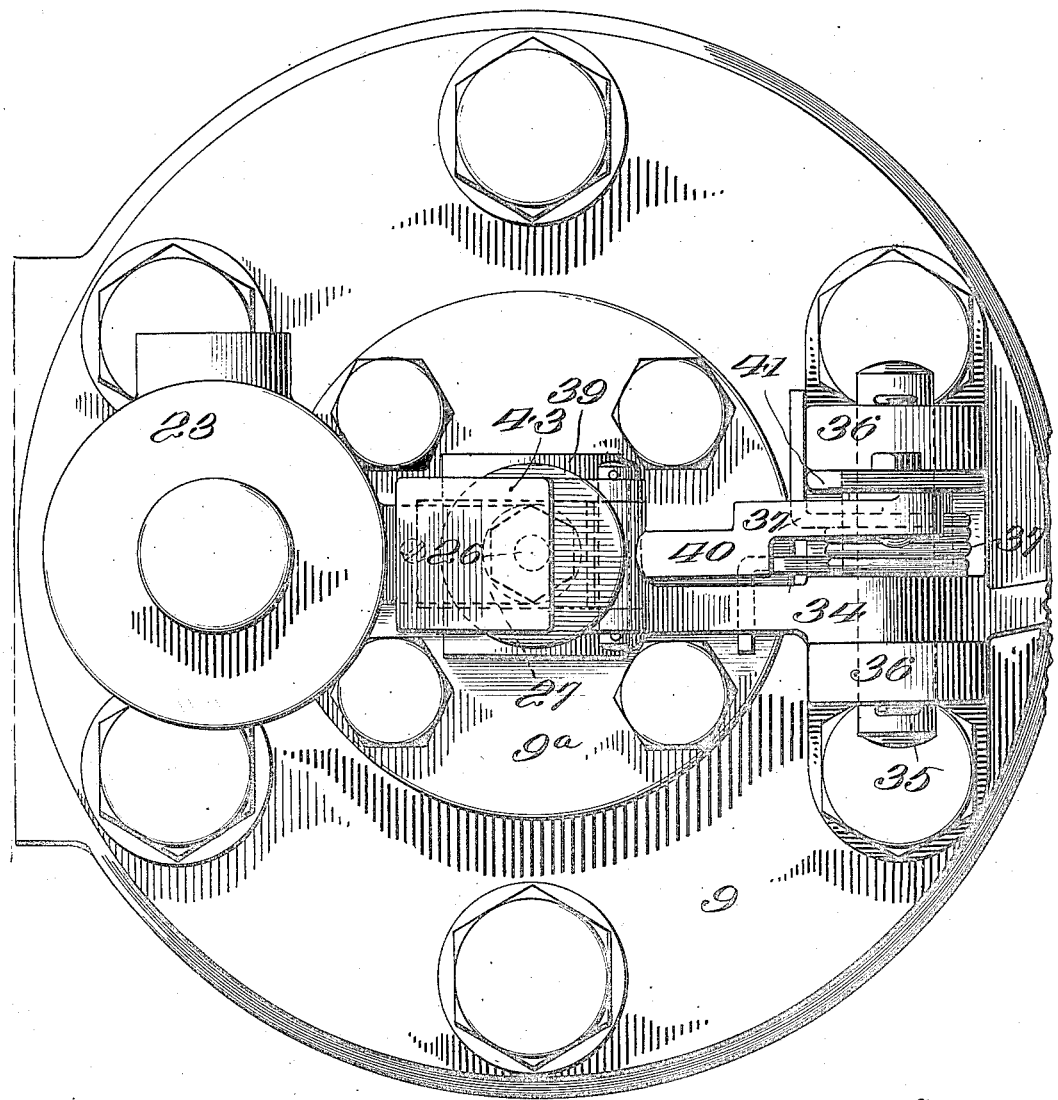

1,468,465

UNITED STATES PATENT OFFICE.

ALBERT ERICKSON, OF CHICAGO, ILLINOIS, ASSIGNOR OF THREE-EIGHTHS TO CHARLES KRATSCH, OF CHICAGO, ILLINOIS, AND THREE-EIGHTHS TO FREDERICK C. MANNING, OF NEWARK, NEW JERSEY.

INTERNAL-COMBUSTION ENGINE.

Application filed December 5, 1917. Serial No. 205,512.

*To all whom it may concern:*

Be it known that I, ALBERT ERICKSON, a citizen of the United States, residing at 948 Addison Street, Chicago, in the county of Cook and State of Illinois, have invented certain new and useful Improvements in Internal-Combustion Engines, of which the following is a specification, reference being had to the accompanying drawing.

This invention has reference to a mechanism adapted to supply fuel to the cylinder of an internal combustion engine and may find special adaptation to that type of engine which operates on what is known as the Diesel or semi-Diesel principle, and in which the fuel is injected directly into the combustion space of the cylinder, ignition of the same being obtained wholly or in part by the heat of a charge of air or other combustion supporting gas which has previously undergone an adiabatic compression in the engine cylinder.

The general object of the present invention is the provision of mechanism of novel and simplified design for supplying fuel to the cylinder of an internal combustion engine.

A further object of the present invention is the provision of fuel admission means in which the charge of fuel is preheated previous to its admission to the engine cylinder.

A further object is the provision of means for cooling that portion of the fuel admission structure which is subjected to the direct heat of combustion in the engine cylinder.

A still further object of the present invention is the provision of means operating in connection with the fuel admission mechanism to control the power output of the engine.

A still further object resides in the particular method of mounting the fuel valve mechanism on the cylinder head of the engine, and operating the same.

For the purpose of rendering the invention more clear, reference is had to the accompanying drawings, in which—

Figure 1 shows a vertical cross sectional view of an internal combustion engine embodying one form of the present invention.

Figure 2 shows a side cross sectional elevation thereof.

Figure 3 shows an enlarged sectional elevation of the fuel supply and controlling mechanism; and Figure 4 shows a plan view of the cylinder head of the engine.

While the invention is shown in connection with a single cylinder two stroke cycle engine it should be understood that my invention does not relate to the type of engine nor to the number of cylinders, the same being applicable to engines having any number of cylinders and operating on either the two, four, or six stroke cycle.

In the figures, reference numeral 1 indicates a combined cylinder and crank case structure in which a crank shaft 2 is mounted in bearings 3, the crank shaft having mounted thereon the usual connecting rod structure 5 carrying at its upper extremity a piston 6, having thereon the usual piston rings.

Mounted upon the top of the cylinder 1, which is provided with the usual water jacket space 7 and exhaust port 8, is a removable cylinder head 9 which carries, removably mounted therein, a valve cage $9^a$ supporting the main admission valve 10. This valve, which controls the communication between the bypass 11, extending from the crank case to the cylinder head, and the interior of the cylinder, has located in its extremity a chamber or pocket 12 which is in communication with the exterior surface of the valve by means of a plurality of small passages or openings $12^a$. Integral with the valve 10 is a hollow valve stem 14, the valve being normally held in closed position by means of the collar 15 and spiral spring 16. Slidably mounted within this hollow valve stem is a second hollow valve stem 17 carrying at one extremity a collar 18 acting against spiral spring 19 which seats on the main valve collar 15. The other extremity of the hollow valve stem 17 carries a poppet head 20 which is normally held against a seat formed in the interior of the main valve 10, by means of the collar 18 and the cooperating resilient spring 19. The poppet head 20 has a horizontal orifice $20^a$ drilled therein which orifice serves to place the hollow interior $20^b$ of the valve stem in communication with chamber 12 when the poppet head is unseated.

A third member 21 fits within the member 17, this member forming means to supply fuel to the interior 20ᵇ of the member 17, which acts as a preheating chamber for the charges of fuel admitted thereto.

Mounted upon the cylinder head 9 of the engine by means of a bracket 22 is a fuel tank 23 which may be of any suitable form, a lateral projection 24 of this fuel tank being drilled out to form an orifice 25 in which the needle valve 26 is normally seated by means of a resilient member 27 which fits in a groove formed in the upper portion of the needle valve. The orifice 25 is counterbored at its lower portion for the reception of member 21 which may be either adapted to enter said counterbore with a sliding fit and move up and down in accordance with the movements of the valves 20 and 10, or else be fixed in the counterbore and adapted to fit into hollow valve stem 17 with a sliding fit.

A cam 28 mounted upon the crank shaft of the engine acts upon a cam follower 29 which in turn acts upon a rocker arm 30 pivoted at 31, this rocker arm acting upon the push rod 32. This push rod which has the usual adjustable head 33 acts upon the rocker arm 34 pivoted upon a horizontal shaft 35 carried in brackets 36 mounted upon the cylinder head, the rocker arm 34 being normally urged upwardly by means of the spiral spring 37, one end of which rests against bracket 36 and the other end of which passes underneath the rocker arm 34, the cam follower thereby being urged to follow the cam contour at all times. The rocker arm 34 is bifurcated at its inner end so as to straddle the projection of the fuel tank 24, the inner rounded bifurcated end 38 forming the actuating means for the valves 10 and 20, as well as the fuel supplying means.

Mounted directly above the bifurcated end 38 of the rocker arm is a bifurcated wedge-shaped member 39, pivotally fastened to a link 40 which in turn is pivotally connected to a controlling lever 41 also mounted upon the shaft 35, the coil spring 37 acting to force member 41 against the standard 36 and thereby tending to frictionally hold the same in whatever position the lever 41 may be placed. Resting on the top of the wedge-shaped member 39 is the plate 42 which has the needle valve 26 fastened integrally thereto, the end portion of the wedge-shaped member being folded over into a retaining projection 43.

The wedge-shaped member 39 may be moved horizontally by means of the lever 41 and connecting link 40, the same thereby providing means for varying both the extent of opening of needle valve 26 and the periods in the engine cycle at which it is opened and closed, thereby controlling the power output of the engine. It is of course understood that the lever 41 may be either manually operated or else may be connected to some form of automatic speed regulating device, so as to render the engine self-governing. The adjustable head 33 on push rod 32 serves to adjust the proportions between the air and fuel, independently of lever 41 as the shortening of push rod 32 will shorten the open period of valve 10 and increase that of needle valve 26 and vice versa.

The block 9ᵃ which carries the entire valve assembly is removably held in the cylinder head by means of bolts, a suitable gasket 13 being placed in a counterbored recess in the cylinder head, this location preventing the gasket from blowing out. By loosening the bolts holding the cage in place the entire valve assembly may be readily removed from the cylinder head after the fuel tank 23 has been lifted off of the brackets 22, and the entire mechanism of the engine is thereby rendered readily accessible. While the valve assembly is removed, access may readily be had to the chamber 12 and valve 20 by unscrewing the cap in valve 10.

The fact that a rocker arm 30 is used in the valve mechanism enables a long bearing 3 to be used, which bearing assists in holding the crank case compression and also enables a cam of large diameter to be used, thereby reducing the effect of cam contour errors, the resultant throw of cam 28 being reduced by the rocker arm 30. This also enables a comparatively short top rocker arm 34 to be used with a consequent lessening of strains on this part and places the push rod 32 in closer relationship to the engine cylinder, making a compact arrangement.

The cyclic operation of the engine is as follows: Considering the piston to be at top dead center, combustion just having occurred, the piston is driven downwards on the power stroke, the charge of air, which has previously been drawn in through the crank case poppet valve 4, being compressed. When the piston reaches a point about 30° above lower dead center, the exhaust port 8 is uncovered. At about this time, the cam 28 actuates push rod 32, causing the bifurcated inner end 38 of the rocker arm 34 to engage the collar 18 which is pushed downwardly against the tension of spring 19. Spring 19 being of less tension than spring 16, poppet valve 20 is opened and permits the charge of oil which has previously been admitted to the preheating chamber 20ᵇ to flow through the hole 20ᵃ into the chamber 12.

As the piston advances about 25° beyond lower dead center the bifurcated end 38 of the rocker arm 34 which continues to move downwards, takes up the clearance between collar 18 and collar 15, and the main valve 10 therefore begins to open, permitting the charge of air now under compression in the crank case to pass upwards through bypass 11 and into the engine cylinder, the contact of this air with the valve 10 serving to keep the same relatively cool and thereby preventing carbonization of chamber 12. Valve 10 now closing and the piston continuing to travel upwards, the air contained therein undergoes adiabatic compression. At the same time the depressed portion of cam 28 comes under cam follower 29 and spring 37 therefore lifts the bifurcated end 38 of the rocker arm 34 upwards against the wedge-shaped member 39, causing the needle valve 26 to be lifted off its seat and permitting the fuel oil to flow from reservoir 23 through the needle valve and down to the preheating chamber 20$^b$ from which it can not escape, the valve 20 being closed at this time. The quantity of oil thus placed in the preheating chamber during each cycle will depend upon the position of the wedge-shaped member 39, it being evident that the needle valve 26 will not be opened to as great an extent or for as long a period of time when the wedge-shaped member 39 is moved to the left as it would be if the wedge-shaped member were moved to the right.

At this time in the cycle of operations the piston is rapidly approaching top dead center, and the charge of air contained therein is compressed to such an extent that when the maximum pressure is reached the preheated liquid fuel in the chamber 12 becomes ignited by pressure through the holes 12$^a$ and the necessary pressure is thereby produced in the cylinder to cause the piston to travel downwardly on its working stroke, thereby completing the cycle of operations.

While the structure is described in connection with an engine of the two-cycle type, it is evident that it may be used in connection with an engine operating on the four-stroke cycle, this change only necessitating the mounting of the cam 23 on a supplemental shaft driven at a two to one gear ratio from the crank shaft, and the placing of an exhaust valve in the engine cylinder.

It is to be understood that the present invention is susceptible of variations from the specific embodiment thereof herein set forth, and that the same may be modified within the scope of the appended claims.

What I claim is:

1. In an internal combustion engine, the combination with an engine cylinder of a valve for controlling the admission of a combustion supporting medium to said cylinder, a chamber in said valve, and means to supply a measured quantity of fuel to said chamber, said chamber being in constant communication with the engine cylinder through a plurality of small passages.

2. In an internal combustion engine, the combination with a cylinder of a main air inlet valve, the exterior surface of which forms a portion of the combustion chamber wall of the cylinder, a chamber in said valve, said chamber being in constant communication with the combustion chamber of the cylinder, and means to supply a measured quantity of fuel to said chamber.

3. In an internal combustion engine, the combination with a cylinder, of a valve, the exterior surface of which forms a portion of the combustion chamber wall of the cylinder, a chamber in said valve, said chamber being in constant communication with the combustion chamber of the cylinder, and means to supply a measured quantity of fuel to said chamber during each cycle of the engine.

4. In an internal combustion engine, the combination of a cylinder having a valve port opening directly into said cylinder, a valve for controlling said port, a chamber in said valve for the reception of a charge of fuel, and a supplementary valve for controlling the admission of fuel to said chamber.

5. In an internal combustion engine, the combination with a cylinder, of a main valve opening into said cylinder, a chamber in said valve for the reception of a charge of fuel, and a supplementary valve concentric with said main valve for controlling the admission of fuel to said chamber.

6. Mechanism for supplying fuel to the cylinder of an internal combustion engine comprising in combination a main valve, the exterior surface of which forms a portion of the combustion chamber wall of the cylinder, said valve having a chamber formed therein, a preheating chamber, means to introduce a predetermined quantity of fuel into said preheating chamber at each cycle of the engine, and a supplementary valve for controlling the admission of the predetermined charge of fuel from the preheating chamber to the chamber in the main valve.

7. Mechanism for supplying fuel to the cylinder of an internal combustion engine comprising in combination a main valve, the exterior surface of which forms a portion of the combustion chamber wall of the cylinder, a chamber formed in said valve and having constant communication with the interior of the cylinder, a hollow stem for said valve, a preheating chamber located within said stem, means to introduce a predetermined charge of fuel into the said preheating chamber at each cycle of the engine, and a supplementary valve concentric with said main valve for controlling the admission of the predetermined charge of fuel from the preheating chamber to the chamber in the main valve.

8. Mechanism for supplying fuel to the cylinder of an internal combustion engine comprising in combination a main valve, the exterior surface of which forms a portion of the combustion chamber wall of the cylinder, a chamber formed in said valve and having constant communication with the interior of the cylinder, a hollow stem for said valve, a preheating chamber located within said stem, means to introduce a predetermined charge of fuel into the said preheating chamber at each cycle of the engine, and a supplementary valve concentric with and located within said main valve for controlling the admission of the predetermined charge of fuel from the preheating chamber to the chamber in the main valve.

9. In an internal combustion engine, the combination with a cylinder of a valve opening into said cylinder, said valve having a hollow stem through which fuel may be supplied to said cylinder, a fuel reservoir mounted on said cylinder and containing an orifice in communication with said hollow valve stem, and means for controlling the flow of fuel through said orifice.

10. In an internal combustion engine, the combination with a cylinder, of a valve opening into said cylinder and having a hollow stem through which fuel may be supplied to said cylinder, a fuel reservoir mounted on said cylinder and containing an orifice therein through which fuel may be supplied to said hollow valve stem, and means located within said fuel reservoir for controlling the flow of fuel through said orifice.

11. In an internal combustion engine, the combination with a cylinder, of a removable cylinder head, a valve cage mounted in said cylinder head and supporting a valve having a hollow stem through which fuel is supplied to said cylinder, a fuel reservoir mounted on said cylinder head and containing an orifice concentric with said hollow valve stem for supplying fuel thereto, and means for controlling the flow of fuel through said orifice.

12. In an internal combustion engine, the combination with a cylinder, of a removable cylinder head, a valve cage mounted in said cylinder head and supporting a valve having a hollow stem through which fuel is supplied to said cylinder, a fuel reservoir mounted on said cylinder head and containing an orifice concentric with said hollow valve stem for supplying fuel thereto, and means located within said fuel reservoir for controlling the flow of fuel through said orifice.

13. In an internal combustion engine, the combination with a cylinder, of a fuel reservoir mounted on said cylinder, means to supply fuel to the interior of said cylinder, an orifice in said fuel reservoir in communication with said fuel supplying means, and means located within said reservoir and periodically actuated by the engine for permitting predetermined charges of fuel to flow through said orifice.

14. In an internal combustion engine, the combination with a cylinder, of a fuel reservoir mounted on said cylinder, means to supply fuel to the interior of said cylinder, an orifice in said fuel reservoir in communication with said fuel supplying means, a needle valve located within said reservoir and normally seated in said orifice, and engine actuated means for periodically lifting said needle valve from its seat for permitting predetermined charges of fuel to flow through said orifice.

15. An internal combustion engine comprising in combination, an engine cylinder, a valve for admitting a supply of combustion supporting medium to the engine cylinder during each cycle of the engine, a fuel valve for supplying a quantity of fuel to the engine during each cycle of the engine, a valve operating member adapted when actuated in one direction to cause the functioning of one of said valves and when actuated in the opposite direction to cause the functioning of the other of said valve, and a cam operated by the engine for controlling the actuation of said valve operating member.

16. An internal combustion engine comprising in combination, an engine cylinder, a valve for admitting a supply of combustion supporting medium to the engine cylinder during each cycle of the engine, a fuel valve for supplying a quantity of fuel to the engine during each cycle of the engine, a valve operating member adapted when actuated in one direction to cause the functioning of one of said valves and when actuated in the opposite direction to cause the functioning of the other of said valves, a cam operated by the engine for controlling the actuation of said valve operating member, and means for altering the effective movement of said valve operating member with respect to said valves, whereby the proportion between the combustion supporting medium and the quantity of fuel supplied to the engine at each cycle may be changed.

17. An internal combustion engine comprising in combination, an engine cylinder, a valve for admitting a supply of combustion supporting medium to the engine cylinder during each cycle of the engine, a fuel valve for supplying a quantity of fuel to the engine during each cycle of the engine, a valve operating mechanism including a push rod adapted when actuated in one direction to cause the functioning of one of said valves and when actuated in the opposite direction to cause the functioning of the other of said valves, a cam operated by the engine for controlling the actuation of said valve operating mechanism, and means for altering the length of said push rod, whereby the proportions between the combustion supporting medium and the quantity of fuel supplied to the engine at each cycle may be changed.

18. Mechanism for regulating the power output of an internal combustion engine comprising in combination a valve for admitting a supply of combustion supporting medium to an engine cylinder during each cycle of the engine, a fuel valve for supplying a quantity of fuel to the engine during each cycle of the engine, a valve operating member traversing a path of movement of fixed extent in both directions during each cycle of the engine, and adapted when actuated in one direction to cause the functioning of said combustion supporting medium valve, and when actuated in the opposite direction to first undergo a preliminary clearance movement and then to cause said fuel valve to function, and means to vary the extent of said clearance movement whereby the quantity of fuel supplied to the engine at each cycle may be varied.

19. Mechanism for regulating the power output of an internal combustion engine comprising in combination a valve for admitting a supply of combustion supporting medium to an engine cylinder during each cycle of the engine, a fuel valve for supplying a quantity of fuel to the engine during each cycle of the engine, a valve operating member traversing a path of movement of fixed extent in both directions during each cycle of the engine, and adapted when actuated in one direction to cause the functioning of said combustion supporting medium valve, and when actuated in the opposite direction to first undergo a preliminary clearance movement and then to cause said fuel valve to function, and means comprising a controlling lever and an adjustable wedge controlled thereby to vary the extent of said clearance movement whereby the quantity of fuel supplied to the engine at each cycle may be varied.

20. In combination with an internal combustion engine, a preheating chamber, mechanism operable in one direction to effect the supply of liquid fuel to said chamber and operable in the opposite direction to effect the discharge of preheated fuel from said chamber to the combustion cup of said engine.

21. In combination with a main inlet valve for internal combustion engines, a combustion cup carried thereby in constant communication with the combustion space of said engine.

22. In combination with a main inlet valve for internal combustion engines, of a chamber carried thereby in constant communication with the combustion space of the engine, and means for supplying measured quantities of preheated liquid fuel thereto.

23. In a main inlet valve for internal combustion engines formed with a chamber in constant communication with the combustion space of said engine, a source of liquid fuel, and means operable during the running of said engine to effect the supply of liquid fuel to said chamber, said means normally restricting communication between said source of liquid fuel and said chamber.

24. The method of operating an internal combustion engine which consists in supplying a measured quantity of liquid fuel to a restricted preheating chamber during the compression stroke, establishing communication from said chamber during the suction stroke to a chamber located in the path of the main supply of incoming combustion supporting medium and in constant communication with the combustion space of the engine.

25. An internal combustion engine having a cylinder and piston wherein combustion of a measured quantity of fuel in a combustion cup is obtained by adiabatic compression of a charge of combustion supporting medium in the cylinder to a temperature above the ignition point of the fuel, characterized by the fact that the combustion cup is in constant communication with the cylinder of the engine and is located in the path of the combustion supporting medium during its admission to the cylinder.

26. The combination, in oil engines, of a primary cylinder attached to the main air intake valve and forming part thereof.

27. The combination, in oil engines, of a primary cylinder attached to the main air intake valve and forming part thereof, the stem of the inlet valve being hollow and forming a long cylinder which is open at the top.

28. The combination in oil engines having a main air inlet valve, of a primary cylinder attached to the main air inlet valve and forming a part thereof, a hollow stem for said inlet valve open at the top through which fuel is supplied to said cylinder, a stationary bracket mounted on said engine, and an extension carried by said bracket extending within said hollow valve stem and having an oil tight fit therein.

In testimony whereof I hereunto affix my signature in the presence of two witnesses.

ALBERT ERICKSON.

Witnesses:
CHAS. KRATSCH,
MABEL MARTIN.